United States Patent
Lin et al.

(10) Patent No.: US 8,995,522 B2
(45) Date of Patent: Mar. 31, 2015

(54) METHOD AND SYSTEM FOR RATE CONTROL

(75) Inventors: Ken Kengkuan Lin, Redwood, CA (US); Peter Hungye Chou, Sunnyvale, CA (US); Shahriar Mohammad Akramullah, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 2210 days.

(21) Appl. No.: 11/734,935

(22) Filed: Apr. 13, 2007

(65) Prior Publication Data

US 2008/0253448 A1 Oct. 16, 2008

(51) Int. Cl.
  H04N 11/02 (2006.01)
  H04N 19/146 (2014.01)
  H04N 19/15 (2014.01)
  H04N 19/174 (2014.01)
  H04N 19/436 (2014.01)

(52) U.S. Cl.
  CPC ............ H04N 19/146 (2014.11); H04N 19/15 (2014.11); H04N 19/174 (2014.11); H04N 19/436 (2014.11)
  USPC ................................ 375/240.03; 375/240.04

(58) Field of Classification Search
  CPC .................... H04N 19/00096; H04N 19/00775
  USPC ......................................... 375/240.03, 240.04
  See application file for complete search history.

(56) References Cited

U.S. PATENT DOCUMENTS

| | | | |
|---|---|---|---|
| 5,426,463 A * | 6/1995 | Reininger et al. ........ 375/240.03 |
| 5,544,284 A | 8/1996 | Allebach et al. |
| 5,666,461 A * | 9/1997 | Igarashi et al. ............... 386/329 |
| 5,832,125 A * | 11/1998 | Reese et al. .................... 382/239 |
| 5,949,490 A * | 9/1999 | Borgwardt et al. ....... 375/240.05 |
| 6,862,402 B2 * | 3/2005 | Kim .............................. 386/330 |
| 6,963,608 B1 | 11/2005 | Wu |
| 7,292,691 B2 | 11/2007 | Candelore et al. |
| 7,856,149 B2 | 12/2010 | Govindaswamy et al. |
| 7,885,337 B2 | 2/2011 | Lee et al. |
| 8,724,698 B2 * | 5/2014 | Lin ........................... 375/240.03 |
| 2003/0206590 A1 * | 11/2003 | Krishnamachari ........ 375/240.16 |

OTHER PUBLICATIONS

Non-Final Office Action, dated Jun. 22, 2011, from related U.S. Appl. No. 11/734,968, filed Apr. 13, 2007.

Ding, "Joint encoder and channel rate control of VBR video over ATM networks," IEEE Trans. on Circuits and Systems for Video Technology, 7(2): 266-278 (Apr. 1997).

(Continued)

Primary Examiner — Baotran N To
(74) Attorney, Agent, or Firm — Kenyon & Kenyon LLP

(57) ABSTRACT

A method and system are provided for encoding a picture. The method includes encoding the picture into a first encoded picture using a first universal quantizer. If a size of the first encoded picture is greater than a maximum picture size, the method includes encoding the picture into a second encoded picture using a second universal quantizer. Before a second-pass encoding, the target size and maximum size for each slice is determined. During the second pass encoding, if a size of the encoded slice is greater than the maximum slice size, the method includes encoding the slice using a third local quantizer. If a size of the encoded slice is still greater than a maximum slice size, the method includes dropping coefficients from the encoded slice to ensure that the encoded size never exceeds the maximum size.

21 Claims, 4 Drawing Sheets

(56) References Cited

OTHER PUBLICATIONS

Ding et al., "Rate control of MPEG video coding and recording by Rate-Quantization modeling," IEEE Trans. on Circuits and Systems for Video Technology, 6(1): 12-20 (Feb. 1996).
Pao et al., "Encoding stored video for streaming applications," IEEE Trans. on Circuits and Systems for Video Technology, 11(2): 199-209 (Feb. 2001).
Yang et al., "Rate control for VBR video over ATM: Simplification and implementation," IEEE Trans. on Circuits and Systems for Video Technology, 11(9): 1045-1058 (Sep. 2001).
Aramvith et al., "A rate-control scheme for video transport over wireless channels," IEEE Trans. on Circuits and Systems for Video Technology, 11(5): 569-580 (May 2001).
Boroczky et al., "Joint rate control with look-ahead for multi-program video coding," IEEE Trans. on Circuits and Systems for Video Technology, 10(7): 1159-1163 (Oct. 2000).
Ribas-Corbera et al., "Rate control in DCT video coding for low-delay communications," IEEE Trans. on Circuits and Systems for Video Technology, 9(1): 172-185 (Feb. 1999).
Cheng et al., "Rate control for an embedded wavelet video coder," IEEE Trans. on Circuits and Systems for Video Technology, 7(4): 696-702 (Aug. 1997).
Fan et al., "An active scene analysis-based approach for pseudoconstant bit-rate video coding," IEEE Trans. on Circuits and Systems for Video Technology, 8(2): 159-170 (Apr. 1998).
Vetro et al., "MPEG-4 rate control for multiple video objects," IEEE Trans. on Circuits and Systems for Video Technology, 9(1): 186-199 (Feb. 1999).
Ronda et al., "Rate control and bit allocation for MPEG-4," IEEE Trans. on Circuits and Systems for Video Technology, 9(8):1243-1258 (Dec. 1999).
Lee et al., "Scalable rate control for MPEG-4 video," IEEE Trans. on Circuits and Systems for Video Technology, 10(6): 878-894 (Sep. 2000).
Pan et al., "A study of MPEG-4 rate control scheme and its improvements," IEEE Trans. on Circuits and Systems for Video Technology, 13(5): 440-446 (May 2003).
Lee et al., "Bit allocation for MPEG-4 video coding with spatio-temporal tradeoffs," IEEE Trans. on Circuits and Systems for Video Technology, 13(6): 488-502 (Jun. 2003).
Zhihai He, Y.K. Kim, and S.K. Mitra, "Low-delay rate control for DCT video coding via $p$-domain source modeling," IEEE Trans. on Circuits and Systems for Video Technology, Aug. 2001, vol. 11, No. 8.
Zhihai He and S.K. Mitra, "Optimum bit allocation and accurate rate control for video coding via $p$-domain source modeling," IEEE Trans. on Circuits and Systems for Video Technology, Oct. 2002, pp. 840-849, vol. 12, No. 10.
Zhihai He and S.K. Mitra, "A unified rate-distortion analysis framework for transform coding," IEEE Trans. on Circuits and Systems for Video Technology, Dec. 2001, pp. 1221-1236, vol. 11, No. 12.
J. Ribas-Corbera and S.M. Lei, "A frame-layer bit allocation for H.263+," IEEE Trans. on Circuits and Systems for Video Technology, Oct. 2000, vol. 10, No. 7.
Y. Yu, J. Zhou, Y. Wang, and C.W. Chen, "A novel two-pass VBR algorithm for fixed-size storage application," IEEE Trans. on Circuits and Systems for Video Technology, Mar. 2001, vol. 11, No. 3.
H. Song and C-C J. Kuo, "Rate control for low-bit rate video via variable-encoding frame rates," IEEE Trans. on Circuits and Systems for Video Technology, Apr. 2001, vol. 11, No. 4.
J. Xin, M.-T. Sung, B.-S. Choi, and K.-W. Chun, "An HDTV-to-SDTV spatial transcoder," IEEE Trans. on Circuits and Systems for Video Technology, Nov. 2002, vol. 11, No. 11.
A. Jagmohan and K. Ratakonda, "MPEG-4 one-pass VBR rate control for digital storage," IEEE Trans. on Circuits and Systems for Video Technology, May 2003, vol. 13, No. 5.
L. Wang and A. Vincent, "Bit allocation and constraints for joint coding of multiple video programs," IEEE Trans. on Circuits and Systems for Video Technology, Sep. 2003, vol. 9, No. 6.

\* cited by examiner

METHOD AND SYSTEM FOR RATE CONTROL

BACKGROUND

Videos include a plurality of sequential pictures displayed one after another. Various techniques exist to convert video into digital form. Digital video is easy to transmit, store, and manipulate. To digitally encode a video, each picture of the video may be digitally encoded. Unfortunately, the resulting encoded picture file may be large and cumbersome. Various compression schemes have been developed to reduce the size of encoded pictures.

Each picture of a video may be encoded individually, either independent of other pictures of the video (intra-coding) or dependent on other pictures of the video (predictive coding). A picture may be organized into slices and further into macroblocks and/or pixel blocks. The encoding process may begin by transforming pixel data of the picture into transform coefficients such as through a discrete cosine transform. The coefficients are then compressed with a quantizer into quantized coefficients. The quantized coefficients are then encoded by a run-length coder. Further encoding (e.g., entropy encoding) may be used for further compressing the resulting bit stream, which is then outputted to a channel, where it may be transmitted or stored.

The size of an encoded picture is influenced by its content, and therefore, it is difficult to predict precisely a file size of an encoded picture in advance. Generally, the selection of a quantizer is the single most significant factor affecting the resulting encoded picture size. However, changes to the quantizer do not always provide a predictable corresponding change to the picture's size. Only quantized coefficients quantized to a nonzero value with a first smaller quantizer may potentially become smaller (and therefore more compressible) when quantized with the second larger quantizer. Any coefficient that is quantized to zero with the first quantizer will remain zero when quantized with the second larger quantizer, therefore not affecting the picture size. Thus, bit rate savings (i.e. the amount of compression) from changing quantizer is dependent on the number of nonzero quantized coefficients.

Moreover, changing the quantizer also can affect the perceived quality of the picture decoded for display. The larger the quantizer (and the higher the compression ratio), the worse the perceived quality of the picture.

Previous approaches to provide an encoded video of a specified size included a trial and error approach. A maximum picture size is determined, and each picture is coded with a first selected quantizer. If the resulting encoded picture exceeds the maximum picture size, a new quantizer is selected and the picture is re-encoded. Thus, several encoding 'passes' over the picture may be required before an encoded picture satisfying the maximum picture size is produced.

The trial and error approach is unsatisfactory for several reasons. It can be time- and resource-consuming due to the number of passes required. The trial and error approach also fails to provide an upper bound on the number of passes over a picture, thus rendering it unsuitable for real-time applications.

A second approach to encode video includes processing each macroblock in the image sequentially, progressively adjusting the quantizer as the encoder encodes the picture. A typical approach is to calculate the average macroblock size and keep track of the number of bits used so far. Before encoding a macroblock, the encoder checks the number of bits it has used so far. If it is using more bits than allocated, it uses a larger quantization step size for the next macroblock. If it is using fewer bits than allocated, it uses a smaller quantization step size for the next macroblock. Unfortunately, this sequential approach is difficult to execute simultaneously across a plurality of processors. In addition, an encoded picture may be encoded with many different quantizers, resulting in annoying variance in perceived visual quality from one macroblock to another when decoded and displayed. Further, the same quantization step size is unlikely to be used again when the image is decoded and re-encoded, resulting in non-trivial multi-generational quality loss.

DETAILED DESCRIPTION

A procedure to code a picture of a video stream with a limited number of coding passes is provided. On each pass, the picture is coded as a plurality of slices and macroblocks, where image data of the macroblocks are subject to coefficient transforms and to quantization by a quantization parameter. On a first pass, the quantization parameter is established as a first value common to all slices of the picture. On a second pass, which is reached if the size of a coded picture data obtained from the first pass exceeds a predetermined limit; the quantization parameter is revised to a second value that is common to all slices of the picture. Before second-pass encoding, the maximum size for each slice is determined. After the second pass encoding, if a slice's coded size exceeds its maximum size, it enters the third pass. The need for a third pass as well as the quantization parameter to be used in the third pass is determined on a slice-by-slice basis. During the third pass, high frequency coefficients are dropped if necessary so that the coded slice size never exceeds the maximum size, which guarantees the coded picture size never exceeds its predetermined limit. If the first pass generates coded picture data that satisfies the predetermined limit, the coded picture data is outputted to a channel. The coded picture data has a picture size approximately equal to a target size but not exceeding the predetermined limit.

Figure 1:
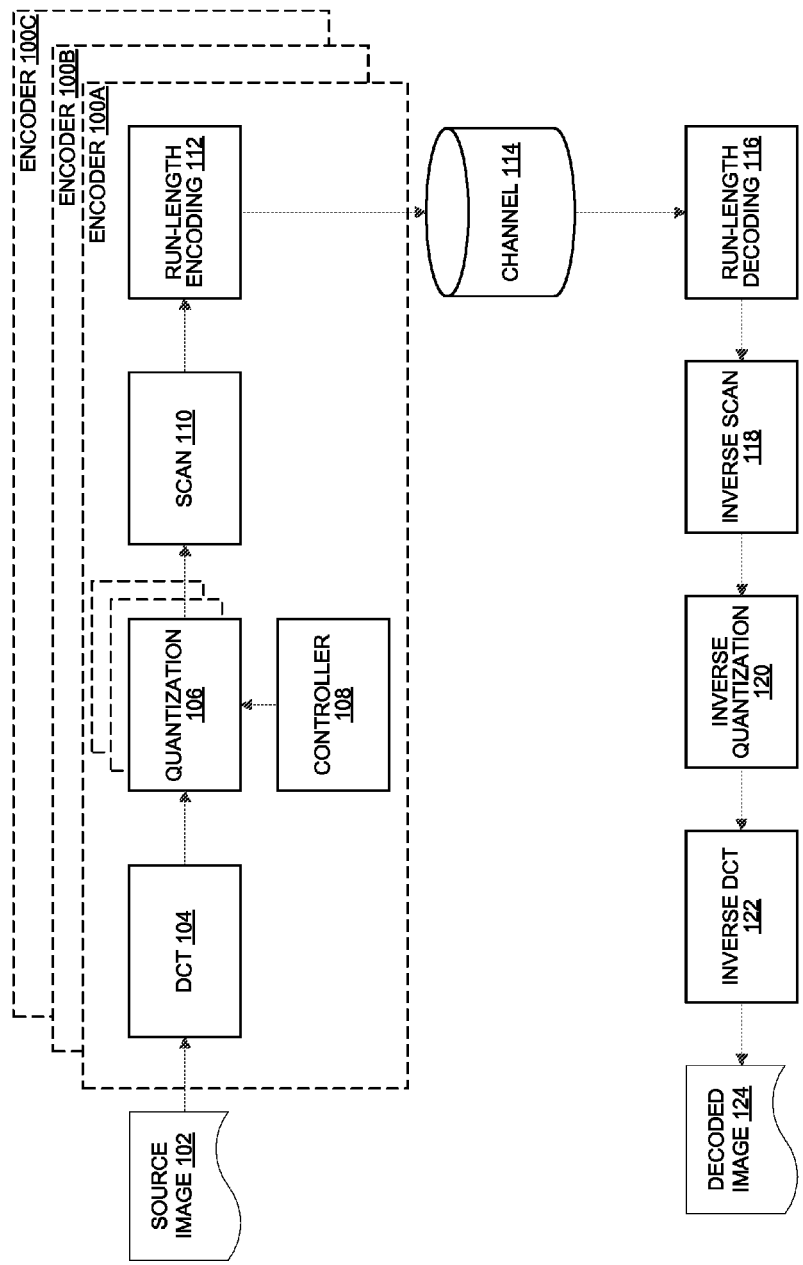
FIG. 1 illustrates an encoder according to an embodiment of the present invention.

FIG. 1 illustrates an encoder according to an embodiment of the present invention. The encoder 100A may be implemented in hardware or software and receives a source image 102, a digital image. For example, the source image 102 may be a picture from a frame. It will be understood that the encoder 100A may also receive a video, where each picture making up the video will be encoded.

The source image 102 is first transformed by a discrete cosine transform ("DCT") unit 104. The transform converts spatial variations into frequency variations and produces an array of transform coefficients associated with the source image 102.

A quantization unit 106 then quantizes (e.g., divides) the array of coefficients produced by the DCT unit 104 by a quantization parameter, producing an array of quantized coefficients. For example, high frequency coefficients tend to be small and may be quantized to zero. A plurality of quantization units may be available within the encoder 100A.

The quantization unit 106 may be controlled by a controller 108. The controller 108 may calculate various values of the quantizer as described and control multiple quantization units 106 within the encoder when encoding in parallel.

A scan unit 110 then scans the array of quantized coefficients and converts it into a string of run and level values. Typically, one corner of the array of quantized coefficients is filled with zeros. By starting in the opposite corner of the matrix, then zigzagging through the array, the encoder converts the 2-dimensional coefficient array to a 1-dimensional list of coefficient values (a string).

A run-length encoding unit 112 may then scan the string and substitute run-length codes for consecutive zeros in that string. The run length encoding unit 112 may then apply Huffman coding to that result, thus reducing the source image 102 to a much smaller bit stream suitable for transmission or storage. The bit stream may be outputted into channel 114. It will be understood that alternative types of encoding may be used in place of run-length encoding.

The process described above may be reversed in a decoder, where the decoder includes a run-length decoding unit 116, an inverse scan unit 118, an inverse quantization unit 120, and an inverse DCT unit 122. Each unit performs the inverse of its counterpart in the encoder 100A, producing a decoded image 124. The inverse quantization unit cannot perfectly recover coefficients because they have been quantized and some precision has been lost. Therefore, the compression process is lossy. The decoded image 124 is a close approximation of the source image 102.

A plurality of encoders may be available, such as encoder 100B and 100C. Or a plurality of quantization units may be available in the encoder 100A.

Figure 2:
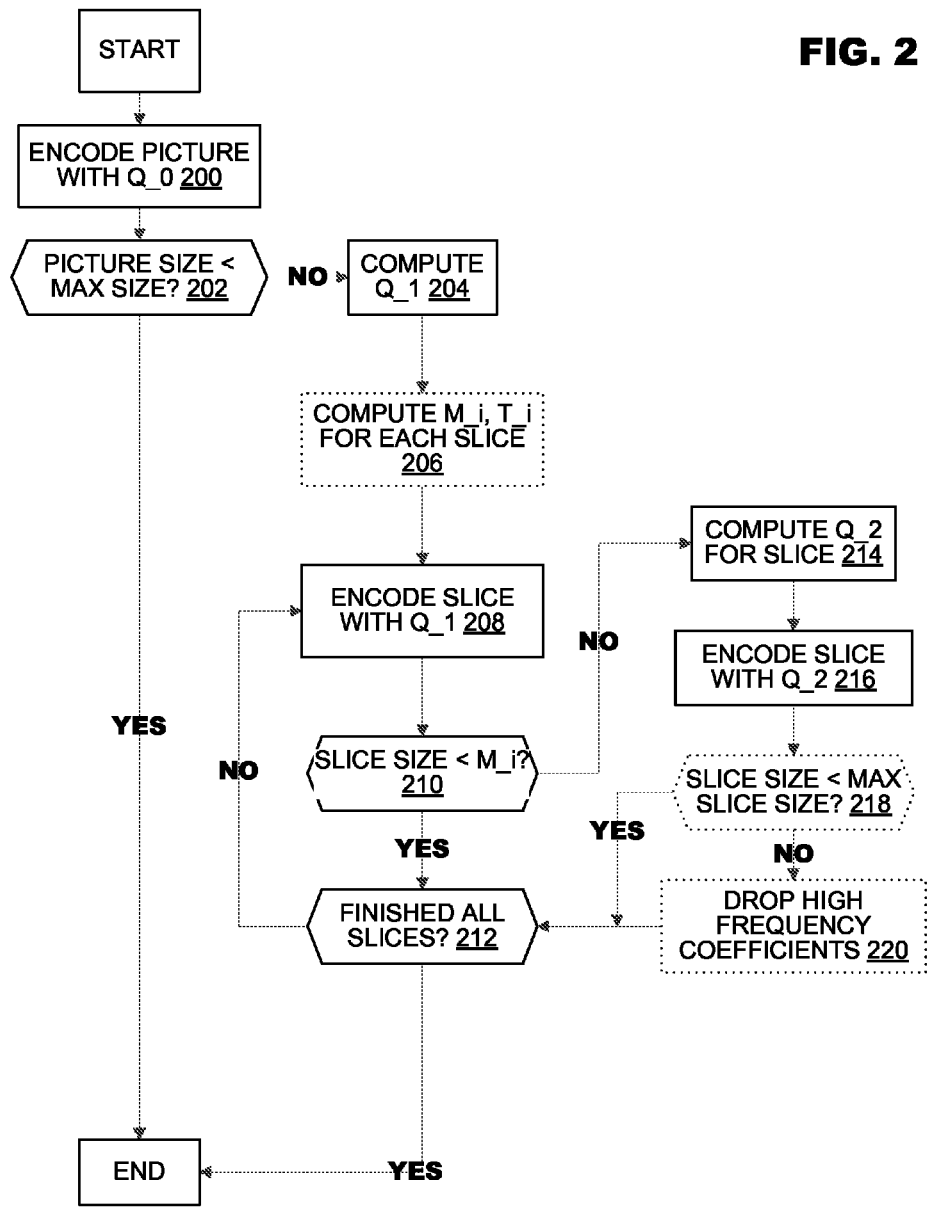
FIG. 2 illustrates a procedure for encoding a picture according to an embodiment of the present invention.

FIG. 2 illustrates a procedure for encoding a picture according to an embodiment of the present invention. The procedure selects a global quantizer within a fixed number of passes, if possible. If not, the procedure selects a local quantizer for each slice that exceeds a targeted slice size. For example, the process may be executed in a quantization unit and controller of an encoder, as described in FIG. 1. The quantization unit may receive an array of transform coefficients from an encoding process described above and produce an array of quantized coefficients.

In 200, the quantization unit may encode every macroblock of a picture with $Q\_0$, a first universal quantizer. The first universal quantizer may be set by default. For example, the first universal quantizer may be small (e.g. 1) for high-quality encoding (minimal compression and information loss) and somewhat larger (e.g. 8) for standard quality encoding.

It will be understood that multiple macroblocks or slices of the picture may be encoded in parallel by multiple processors, as described in FIG. 1. The value of the first universal quantizer is known at the start of the procedure, and therefore the encoding of each macroblock is not dependent on the encoding of any other macroblock.

In 202, the quantization unit tests whether the resulting encoded picture from 200 has a size less than a maximum picture size. If yes, the procedure ends after a first pass through the picture and an encoded picture is produced.

For example, the maximum picture size may be a value selected by the programmer, depending on the intended use of the resulting encoded picture.

If the size of the resulting encoded picture from 200 is greater than the maximum picture size, then a larger quantizer is required. $Q\_1$, a second universal quantizer is calculated in 204. The second universal quantizer is a higher value than the first universal quantizer and thus provides more compression.

In 206, the quantization unit may compute a maximum size $M\_i$ and a target size $T\_i$ for each slice i. The sum of $M\_i$ for all slices must not exceed the maximum size of the picture, so that the coded picture size is guaranteed to be smaller than or equal to the maximum picture size as long as each slice's coded size does not exceed its maximum size. The sum of $T\_i$ for all slices should be close to the picture target size, so that the coded picture size is close to picture target size as long as each slice's coded size is close to its target size.

In 208, a slice i of the picture is encoded with the second universal quantizer calculated in 204. Similar to 200, it will be understood that multiple macroblocks or slices may be encoded in parallel with the second universal quantizer.

In 210, the quantization unit tests if the resulting encoded slice from 208 has a size less than the associated maximum slice size. If yes, it tests if all slices have been encoded in 212. If no, the quantization unit proceeds to 214.

In 212, if all slices of the picture have been encoded, the procedure ends after a second pass through the picture and an encoded picture is produced. If no, the procedure returns to 208, where another slice of the picture is encoded.

In 214, the quantization unit begins a third pass for a slice if its second-pass size exceeds its maximum size $M\_i$. $Q\_2$, a third local quantizer is calculated for this slice requiring further compression. The third local quantizer may be calculated similarly to the second universal quantizer, based on the encoded result from encoding with the second universal quantizer and a number of tokens in the second pass. The quantization unit also calculates a MaxLum, MaxCb, and MaxCr, reflecting the maximum number of bytes to be dedicated to each property luminance, blue chrominance, and red chrominance. These values are used to balance quality among the three components in case high frequency coefficients need to be dropped to satisfy the maximum size constraint.

In 216, each macroblock of the slice is encoded with the third local quantizer. Similar to 200, it will be understood that multiple macroblocks may be quantized in parallel with the third local quantizer. During the encoding process, no more bits are generated than $M\_i$. If the third local quantizer (i.e. the largest of the three quantizers) still fails to limit the coded size within $M\_i$, high frequency coefficients are gradually dropped so that minimum loss of visual quality occurs. MaxLum is used to ensure that the coded luminance size for a slice is less than a predetermined maximum, such that there are bits available to encode the Cb and the Cr coefficients. Similarly, MaxCb ensures that a limit exists for the Cb coefficients and bits are available to encode the Cr coefficients. Thus, when some high frequency coefficients are dropped, the resulting bit stream still contains both luminance and chrominance components, and is correctly decodable nonetheless. In 218, the encoder tests if the maximum slice size has been exceeded. If yes, high-frequency coefficients are dropped in 220 using MaxLum, MaxCb and MaxCr calculated in 214 as described above. If no, the encoder proceeds to 212. It can be seen that only slices that were not compressed sufficiently by the second universal quantizer will be encoded with the third local quantizer. After all slices are encoded with sizes smaller than their respective predetermined thresholds ($M\_i$ for slice i), the encoder has produced an encoded picture with a size less than the maximum size.

The second and third universal quantizer may be calculated in a variety of methods. For example, the second universal quantizer may be calculated as follows:

As described above, not all quantized coefficients contribute to reduce the size of a picture when the quantizer is increased from a first quantizer to a second quantizer. Let numTokens be the number of nonzero quantized coefficients after encoding with the first quantizer; that is, the number of quantized coefficients that may potentially contribute to bit rate reduction.

It has been observed that log (second quantizer/first quantizer) is approximately proportional to ((encoded size with second quantizer)−(encoded size with first quantizer))/numTokens. Therefore, the second universal quantizer can be calculated as $Q\_1=Q\_0*(C^{\wedge}(targetBitsReduction/numTokens))$, where targetBitsReduction is the difference between the resulting encoded picture size determined in 202 and the target picture size. C is a constant, and has been found to be between 1.1 and 1.8 for most images. The actual value of C can be chosen to fit the needs for different applications.

The maximum slice size M_i and target slice size T_i may be calculated for each slice i in the picture along with the second universal quantizer in 204. For example, maximum slice size is calculated proportionally to target slice size, adjusted so that the sum of all maximum slice sizes does not exceed the maximum picture size.

Target slice size may be calculated as (encoded slice size after encoding with first universal quantizer (calculated in 200)−estimated slice bit reduction). The estimated slice bit reduction may be log (second universal quantizer/first universal quantizer)/log(C)*number of tokens in slice.

The procedure described above encodes a picture into a resulting encoded picture with a size approximately equal to a target picture size but not exceeding a maximum picture size. The procedure requires no more than three passes over any slice and may be divided into sub-procedures to be executed in parallel across multiple processors.

The procedure also provides an encoding method where the encoding of each picture does not depend on the result of any other picture. Thus, multiple frames may be processed simultaneously in parallel by multiple processors. This also improves the probability that the same quantizer is used for multiple generations of encoding/decoding because the quantizer choice depends only on the picture itself and does not depend on adjacent pictures.

The chances that the same quantizer is used for successive generations of encoding/decoding is further improved when all or a substantial number of macroblocks in a picture are encoded with a single quantizer. This reduces potential quality degradation caused by post-production manipulation of the pictures. Multi-generational quality loss occurs when an encoded video is decoded, and the decoded video is re-encoded.

Figure 3:
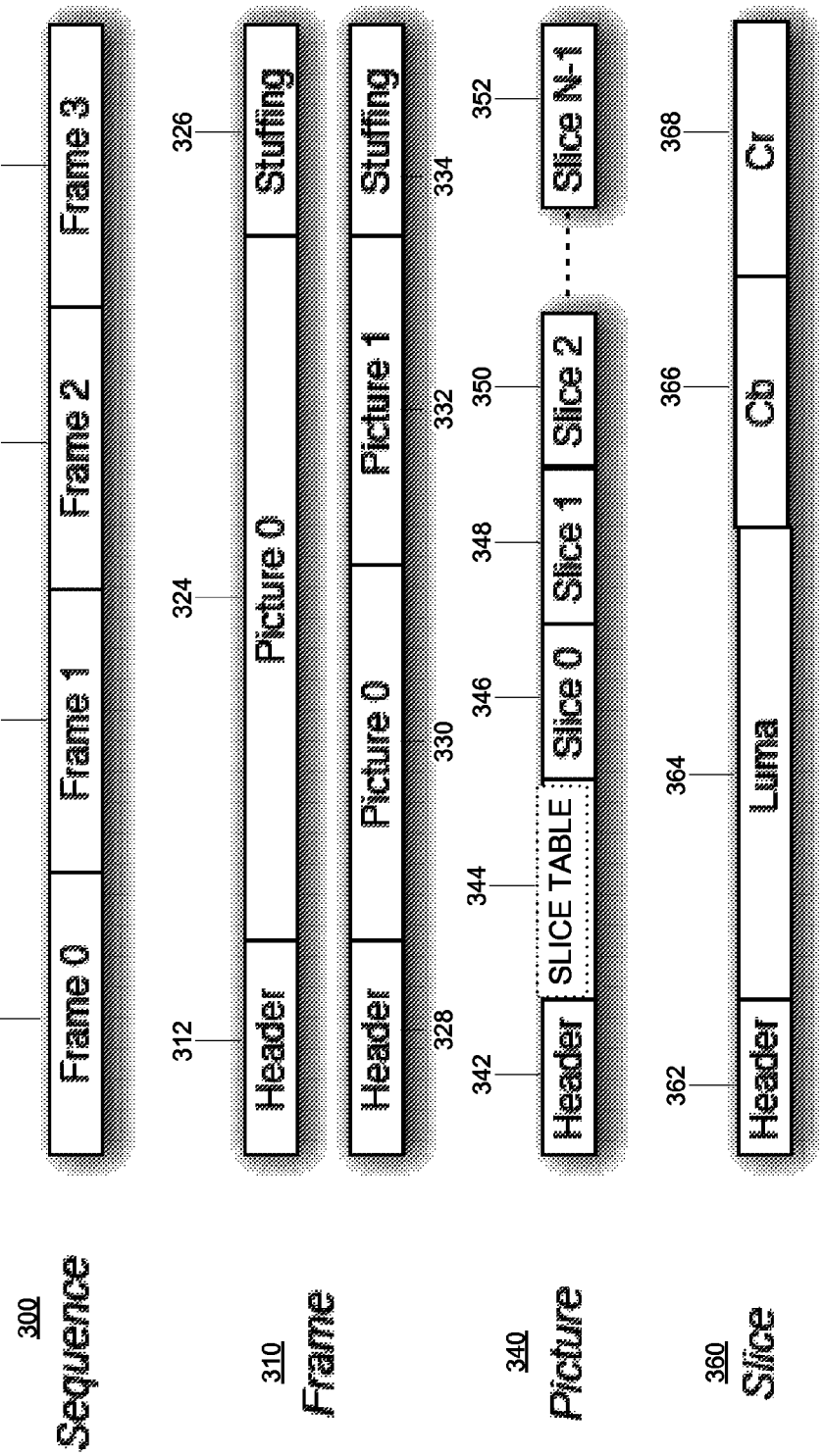
FIG. 3 illustrates a bit stream according to an embodiment of the present invention.

FIG. 3 illustrates a bit stream according to an embodiment of the present invention. A video may be a sequence of images 300 including a plurality of frames 302, 304, 306, and 308. It is understood that while only four frames are depicted in sequence 300, any number of frames may be included in a sequence.

A frame 310 may include a header 312, picture field 324, and possibly stuffing data 326. The header 312 may include header information, such as metadata relating to the picture field 324, a frame identifier, a size of the picture, frame dimension, frame rate information, and color information. The picture field 324 may be an encoded video frame, for example, as encoded by the procedure described later. The stuffing 326 may be filler bits provided as needed to guarantee the frame 310 is a specified size, for example, for storage or transmission reasons. The frame 310 may include one picture field 324 if the frame is intended for a progressive scan.

In an alternative embodiment, the frame 310 may include a header 328, a first picture field 330, a second picture field 332, and stuffing 334. The header 328 may be similar to the header described above. Each of the picture fields 330 and 332 may be similar to the picture field described above. The stuffing 334 may be similar to the stuffing described above. Frame 310 may store a plurality of picture fields. It is understood that while only two picture fields are depicted, any number of picture fields may be included within a frame. The frame 300 may include two picture fields 330 and 332 if the frame is intended for an interlaced scan.

A picture 340 may include a header 342, which may include header information, such as metadata relating to the picture 340 or as described above. The picture 340 may include a slice table 344 of slice sizes, which may be used to index all slices stored in the picture 340. The picture 340 may include slices 346, 348, 350 and 352. The slice table 344 may be optional. It is understood that while only four slices are depicted, any number of slices may be included within a picture. Each slice may be as described below.

A slice 360 may include a header 362, which may include header information, such as metadata relating to the slice 360 or as described above. The slice 360 may include a field for luminance content 364, for blue chrominance content 366, and for red chrominance content 368. Together, the three components may describe a slice of a picture in digital form. The slice 360 may further be divided into macroblocks, where each macroblock is a 16×16 array of pixels to be displayed, and display property data associated with the pixels. Each macroblock may include a number of blocks or pixel blocks.

Figure 4:
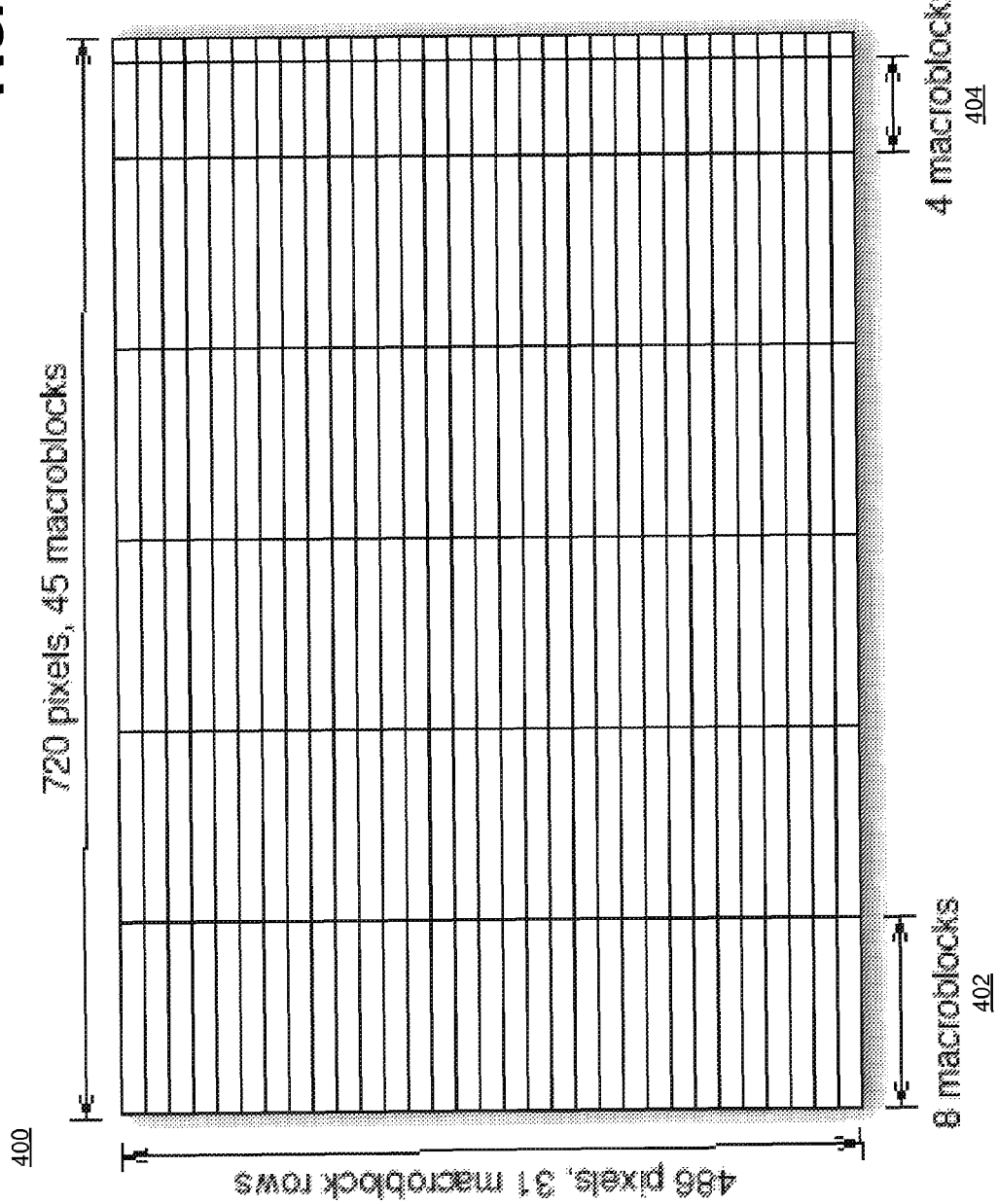
FIG. 4 illustrates a picture division scheme according to an embodiment of the present invention.

FIG. 4 illustrates a picture division scheme according to an embodiment of the present invention. For example, a picture 400 may be 720 pixels horizontally and 486 lines vertically. Each pixel may be associated with display property data (luminance, blue chrominance, and red chrominance).

The picture is further divided into macroblocks, with each macroblock including an array of 16×16 pixels. Any number of macroblocks may be combined into a slice. For example, a plurality of eight macroblocks 42 may be combined into a first slice. Similarly, a plurality of four macroblocks 404 may be combined into a second slice. As described in FIG. 3, a slice may contain display property data of its associated pixels, where the pixels are organized by macroblock. Optionally, macroblock data may be organized into sub-macroblock partitions (e.g., 8×8 blocks) for coding.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

We claim:

1. A method of coding a picture within a video stream with a limited number of coding passes, comprising:
   on each pass, coding the picture as a plurality of slices and macroblocks, image data of the macroblocks being subject to coefficient transforms and to quantization by a quantization parameter, wherein on a first pass, establishing the quantization parameter as a first value used for coding every slice of the picture, on a second pass, which is reached if a size of a coded picture data obtained from the first pass exceeds a predetermined limit, revising the quantization parameter to a second value and coding every slice of the picture using the second value, on a third pass, which is reached if a size of a code slice data obtained from the second pass exceeds a predetermined slice limit, revising the quantization parameter for each slice that exceeds an associated maximum slice size, on a slice-by-slice basis, and when a pass generates coded picture data that satisfies the predetermined limit, outputting the coded picture data to a channel.

2. The method of claim 1, wherein on the third pass the revised quantization parameter of each slice is based on a size of a coded slice obtained in a prior pass.

3. The method of claim 1, further comprising if, following coding of a slice according to the revised quantization parameter of the slice, the coded data of the slice exceeds a predetermined slice limit, canceling predetermined coefficients until the coded data of the slice meets the predetermined slice limit.

4. The method of claim 1, wherein at least two of the macroblocks in the first, second, and third passes are encoded in parallel.

5. The method of claim 1, wherein the quantization parameter is initialized to a programmer-determined value.

6. A method for encoding a picture, comprising:
encoding the picture into a first encoded picture using a first universal quantizer;
if a size of the first encoded picture is greater than a maximum picture size, encoding the picture into a second encoded picture using a second universal quantizer; and
if a size of a portion of the second encoded picture is greater than the maximum size for the portion of the picture, encoding the portion of the picture into an encoded portion of the picture using a third local quantizer.

7. The method of claim 6, further comprising:
if a size of the encoded portion of the picture is greater than a maximum portion size, dropping coefficients from the encoded portion of the picture.

8. The method of claim 7, wherein the dropped coefficients are a set of high-frequency coefficients of the portion of the picture.

9. The method of claim 6, wherein the portion of the picture is a slice or a macroblock of the picture.

10. The method of claim 6, wherein the method requires no more than a predetermined number of passes over the picture.

11. The method of claim 6, further comprising:
encoding the picture on a first processor; and
encoding a second picture on a second processor substantially concurrently with the encoding of the picture.

12. The method of claim 6, wherein the first universal quantizer is programmer-determined.

13. The method of claim 6, wherein the second universal quantizer and the third local quantizer are calculated in part based on a number of nonzero quantized coefficients in the first encoded picture.

14. A system for encoding a picture, comprising:
a memory, the memory storing a first universal quantizer and a maximum picture size;
a quantization unit, the quantization unit configured to quantize an array of transform coefficients into an array of quantized coefficients; and
a controller in communication with the memory and the quantization unit, the controller configured to:
encode the picture into a first encoded picture using the first universal quantizer,
if a size of the first encoded picture is greater than the maximum picture size,
calculate a second universal quantizer, and
encode the picture into a second encoded picture using a second universal quantizer, and
if a size of the second encoded picture is greater than the maximum picture size,
calculate a third local quantizer, and
encode a portion of the picture into an encoded portion of the picture using a third local quantizer.

15. The system of claim 14, wherein the controller is further configured,
if a size of the encoded portion of the picture is greater than a maximum portion size, drop coefficients from the encoded portion of the picture.

16. The system of claim 15, wherein the dropped coefficients are a set of high-frequency coefficients of the portion of the picture.

17. The system of claim 14, further comprising:
a discrete cosine transform unit, the discrete cosine transform unit configured to provide an array of transform coefficients representing a picture to the quantization unit.

18. The system of claim 14, further comprising:
a scanning unit, the scanning unit configured to convert an array of quantized coefficients produced by the quantization unit into a string.

19. The system of claim 14, wherein the portion of the picture is a slice or a macroblock of the picture.

20. The system of claim 14, further comprising:
a second controller, wherein a second picture is encoded by the second controller and the first picture is encoded substantially concurrently.

21. The system of claim 14, wherein the second universal quantizer and the third local quantizer are calculated in part based on a number of nonzero quantized coefficients in the first encoded picture.

* * * * *

UNITED STATES PATENT AND TRADEMARK OFFICE
CERTIFICATE OF CORRECTION

PATENT NO. : 8,995,522 B2
APPLICATION NO. : 11/734935
DATED : March 31, 2015
INVENTOR(S) : Ken Kengkuan Lin et al.

Page 1 of 1

It is certified that error appears in the above-identified patent and that said Letters Patent is hereby corrected as shown below:

Claims

In Claim 3, Column 7, Line 19, please change:

"further comprising" to -- further comprising: --.

Signed and Sealed this
Twenty-third Day of February, 2016

Michelle K. Lee
*Director of the United States Patent and Trademark Office*